(12) United States Patent
Kakomura et al.

(10) Patent No.: US 11,640,272 B2
(45) Date of Patent: May 2, 2023

(54) IMAGE FORMING SYSTEM THAT EXECUTES RECOVERY PROCESS

(71) Applicant: CANON KABUSHIKI KAISHA, Tokyo (JP)

(72) Inventors: Kiyoharu Kakomura, Chiba (JP); Noriaki Matsui, Chiba (JP); Takashi Yokoya, Saitama (JP); Takuya Machida, Chiba (JP); Shun Motohashi, Saitama (JP); Toshifumi Oikawa, Ibaraki (JP); Tadao Sugiura, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/501,265

(22) Filed: Oct. 14, 2021

(65) Prior Publication Data
US 2022/0179600 A1 Jun. 9, 2022

(30) Foreign Application Priority Data

Dec. 8, 2020 (JP) .............................. JP2020-203652

(51) Int. Cl.
G06F 3/12 (2006.01)
G06T 7/00 (2017.01)

(52) U.S. Cl.
CPC ............ *G06F 3/1234* (2013.01); *G06F 3/121* (2013.01); *G06F 3/1254* (2013.01); *G06F 3/1256* (2013.01); *G06F 3/1259* (2013.01); *G06T 7/0004* (2013.01); *G06T 2207/30144* (2013.01)

(58) Field of Classification Search
CPC ...... G06F 3/1234; G06F 3/121; G06F 3/1254; G06F 3/1256; G06F 3/1259; G06F 3/1253; G06F 3/1285; G06T 7/0004; G06T 2207/30144
USPC ...................................... 358/1.14
See application file for complete search history.

(56) References Cited

U.S. PATENT DOCUMENTS

| | | | |
|---|---|---|---|
| 6,804,473 B2 | 10/2004 | Nakamura et al. | |
| 2018/0096472 A1* | 4/2018 | Ukishima | B41J 2/155 |
| 2020/0051231 A1* | 2/2020 | Tsukamoto | G06T 7/0002 |

FOREIGN PATENT DOCUMENTS

JP 2004-020650 A 1/2004

* cited by examiner

*Primary Examiner* — Darryl V Dottin
(74) *Attorney, Agent, or Firm* — Venable LLP

(57) ABSTRACT

An image forming system includes a controller to discharge to a first discharger a sheet determined not to have a product defect and discharge to a second discharger a sheet determined to have a product defect. The controller is configured to, in a case where it is determined that a first sheet on which an image has been formed has the product defect, execute an adjustment operation of adjusting image forming conditions for an image former, and execute a recovery process in which the image formed on the first sheet is formed on a second sheet by the image former with the product defect removed based on completion of the adjustment operation.

13 Claims, 14 Drawing Sheets

FIG. 5

| JOB ID | SHEET NUMBER | CASSETTE | PAGE NUMBER | INSPECTION RESULT |
|---|---|---|---|---|
| 0001 | 1 | CASSETTE 201 | FIRST SIDE: 1 SECOND SIDE: 2 | NONE |
| 0001 | 2 | CASSETTE 201 | FIRST SIDE: 3 SECOND SIDE: 4 | NONE |
| 0001 | 3 | CASSETTE 201 | FIRST SIDE: 5 SECOND SIDE: 6 | NONE |
| 0001 | 4 | CASSETTE 201 | FIRST SIDE: 7 SECOND SIDE: 8 | NONE |
| ... | ... | ... | ... | ... |

310

IMAGE FORMING SYSTEM THAT EXECUTES RECOVERY PROCESS

BACKGROUND OF THE INVENTION

Field of the Invention

The present invention relates to an image forming system that performs a recovery process when a product defect occurs.

Description of the Related Art

Japanese Patent Laid-Open No. 2004-020650 discloses an image forming apparatus that performs a recovery process when a product defect occurs. Here, product defects include an image defect of a formed image and a defect caused to a sheet such as folding of the sheet at the time of conveyance. That is, product defects refer to any defect caused to a sheet on which an image, which is an output of the image forming apparatus, is formed (i.e., a product). The recovery process refers to a process of resuming image formation from an image formed on a sheet having a product defect.

In the configuration of Japanese Patent Laid-Open No. 2004-020650, even if the recovery process is performed, a product defect may occur again after the image formation is restarted. Specifically, product defects can be classified into sporadic defects such as folding of a sheet and recurring defects that can be caused by a rise in temperature and the like of the image forming apparatus. Generally, in order to suppress recurring defects, it is necessary to perform the operation of adjusting the image forming apparatus. On the other hand, since sporadic defects occur singly, the operation of adjusting the image forming apparatus is unnecessary. Therefore, when a recurring defect occurs, with the configuration of Japanese Patent Laid-Open No. 2004-020650 there is a high possibility that a product defect may occur again even if the recovery process is performed, and the time required for image formation may become long.

SUMMARY OF THE INVENTION

The present invention provides a technique for preventing an increase in the time required for image formation when a product defect occurs.

According to a present disclosure, an image forming system includes: an image forming unit configured to form an image on a sheet; an inspection unit configured to inspect the sheet on which the image has been formed by the image forming unit and determine whether or not the sheet has a product defect; a first discharge unit to which the sheet on which the image has been formed by the image forming unit is discharged; a second discharge unit to which the sheet on which the image has been formed by the image forming unit is discharged; and a control unit configured to discharge to the first discharge unit the sheet determined by the inspection unit to not have the product defect and discharge to the second discharge unit the sheet determined by the inspection unit to have the product defect, wherein the control unit is configured to, in a case where the inspection unit determines that a first sheet on which the image has been formed by the image forming unit has the product defect, execute a recovery process in which the image formed on the first sheet is formed on a second sheet by the image forming unit, and the control unit is configured to, in a case where the inspection unit determines that the first sheet has the product defect, execute an adjustment operation of adjusting an image forming condition for the image forming unit prior to executing the recovery process.

Further features of the present invention will become apparent from the following description of exemplary embodiments with reference to the attached drawings.

BRIEF DESCRIPTION OF THE DRAWINGS

FIG. 5 is a diagram illustrating a print job management table according to the embodiment.

DESCRIPTION OF THE EMBODIMENTS

Figure 1:
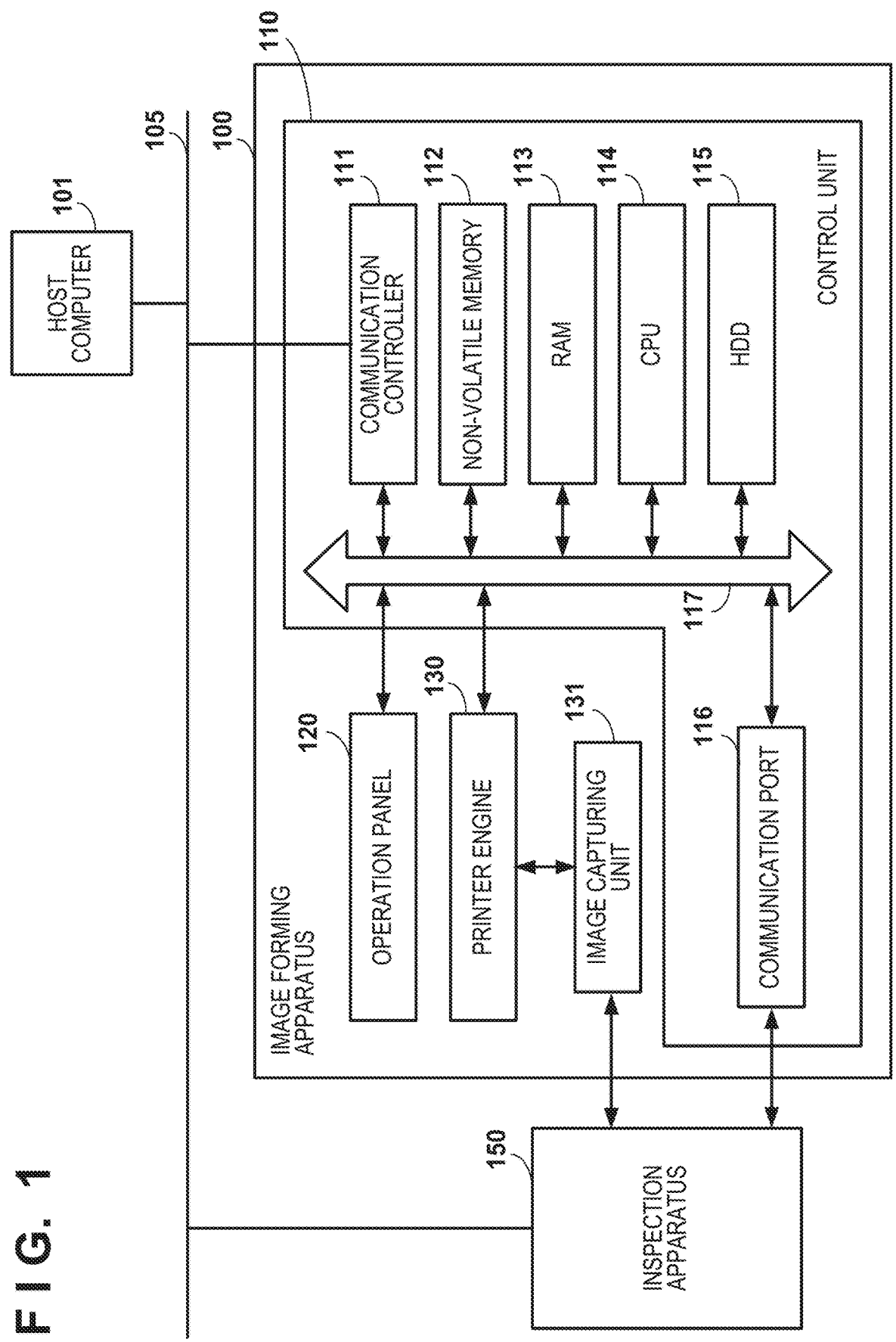
FIG. 1 is a configuration diagram of an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image forming system according to the present embodiment, upon detecting a product defect, executes an adjustment operation for preventing the occurrence of product defects before performing a recovery process and performs the recovery process after the completion of the adjustment operation. As a result, even if a product defect occurs, the time required for image formation is prevented from becoming long. Note that as described above, when the product defect is a sporadic defect, the adjustment operation is generally unnecessary. Therefore, in the present embodiment, a process of determining whether or not the caused product defect is a recurring defect is provided, and when it is determined that the defect is a recurring defect, the recovery process is performed. However, it is also possible to configure such that the recovery process is always performed when a product defect is detected. Hereinafter, the present embodiment will be described in detail.

FIG. 1 illustrates the image forming system according to the present embodiment. According to FIG. 1, an image forming apparatus 100, a host computer 101, and an inspection apparatus 150 are configured to be able to communicate with each other via a network 105. The network 105 can be, for example, a wired or wireless LAN (local area network) or a wide area network (WAN). First, a control unit 110 of the image forming apparatus 100 will be described. A communication controller 111 controls communication via the network 105. A non-volatile memory 112 stores programs such as a control program, data, and the like to be stored even when the power of the image forming apparatus 100 is turned off. A CPU 114 executes control programs and controls the entire image forming apparatus 100. Note that at that time, the CPU 114 uses a RAM 113 as a work area. An HDD 115 is a storage device used for temporary or long-term storage of large amounts of data, such as image data and various kinds of setting data. A communication port 116 performs a process of communicating with the inspection apparatus 150. Each functional block of the control unit 110 is connected to each other via a system bus 117. Furthermore, the system bus 117 is also connected to an operation panel 120 and a printer engine 130.

The host computer 101, when causing the image forming apparatus 100 to form an image, creates a print job and transmits it to the control unit 110 of the image forming apparatus 100. The control unit 110, upon receiving a print job from the host computer 101, controls the printer engine 130 in accordance with the print job to form an image on the sheet. Though each member (hardware configuration) for forming an image on a sheet by the printer engine 130 will be described later with reference to FIGS. 2 and 3, the members include an image capturing unit 131. The image capturing unit 131 captures a sheet on which an image has been formed and transmits the image data of the captured sheet to the inspection apparatus 150. The operation panel 120 has, for example, a touch panel, and provides a user interface for the user to operate the image forming apparatus 100. Note that the operation panel 120 displays the state of the image forming apparatus 100 to the user.

Note that in FIG. 1, the image capturing unit 131 is configured to directly transmit image data to the inspection apparatus 150 but may be configured to transmit image data to the inspection apparatus 150 via the printer engine 130 and the communication port 116. In addition, the image capturing unit 131 may be configured to transmit image data to the inspection apparatus 150 through the network 105 via the printer engine 130 and the communication controller 111. In FIG. 1, the control unit 110 is configured to be able to communicate with the inspection apparatus 150 via the communication port 116 but may be configured to communicate with the inspection apparatus 150 only via the network 105 without the communication port 116 being provided.

Figure 2:
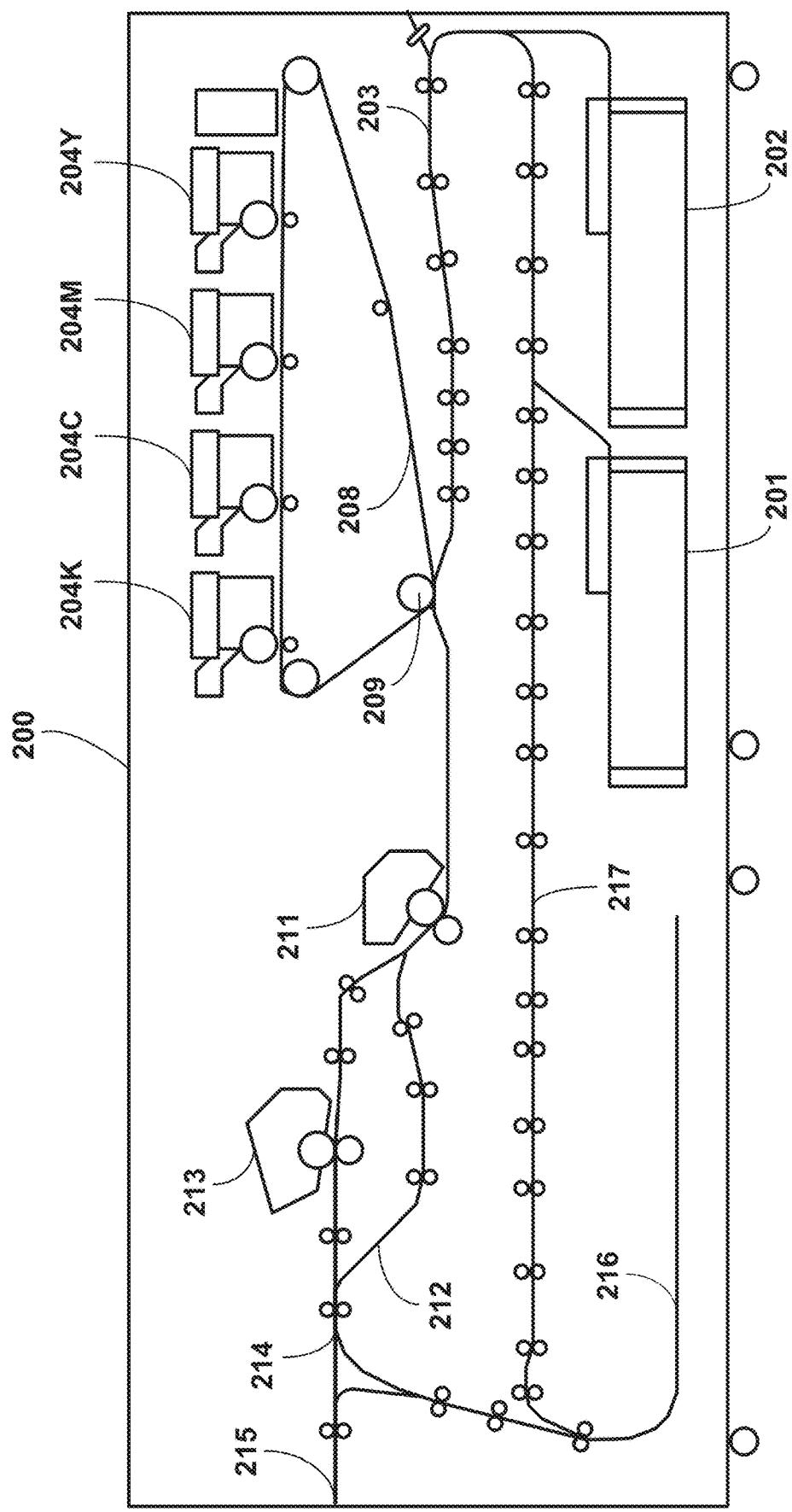
FIG. 2 is a configuration diagram of an image forming apparatus according to the embodiment.
Figure 3:
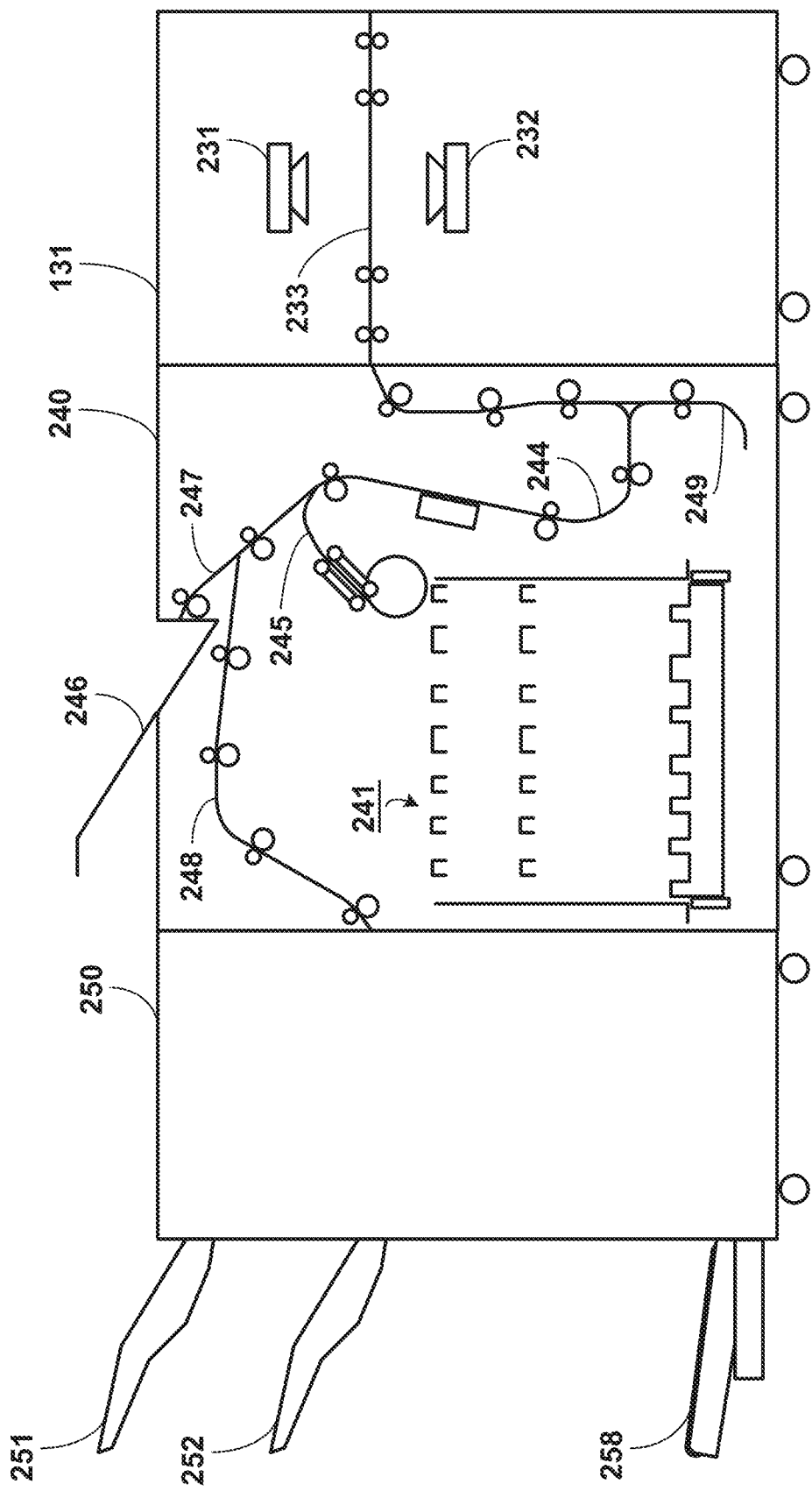
FIG. 3 is a configuration diagram of the image forming apparatus according to the embodiment.

FIGS. 2 and 3 are configuration diagrams of the image forming apparatus 100. The image forming apparatus 100 includes an image forming unit 200 (FIG. 2) that forms images on sheets and the image capturing unit 131, a stacker 240, and a finisher 250 that are disposed downstream of the image forming unit 200 in a conveyance direction of sheets (FIG. 3).

Figure 4:
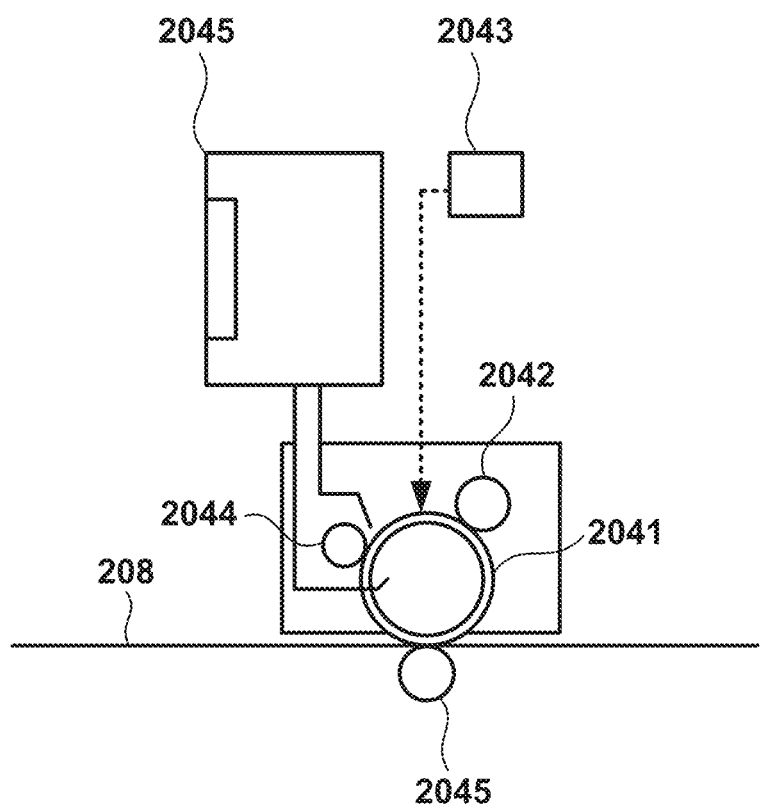
FIG. 4 is a configuration diagram of a development station according to the embodiment.

First, the image forming unit 200 will be described. The development stations 204Y, 204M, 204C and 204K respectively form toner images of yellow, magenta, cyan, and black and transfer these to an intermediate transfer belt 208. Note that by transferring the toner images of the respective colors to the intermediate transfer belt 208 in a superimposed manner, a full-color toner image can be formed on the intermediate transfer belt 208. The configurations of development stations 204Y, 204M, 204C and 204K are similar and are illustrated in FIG. 4. A photosensitive body 2041 is driven to rotate in a counterclockwise direction in the figure at the time of image formation. A charging roller 2042 charges the surface of the photosensitive body 2041 to a uniform potential. An exposure apparatus 2043 forms an electrostatic latent image on the photosensitive body 2041 by scanning the charged and rotating photosensitive body 2041 in a main scanning direction with light. Note that the main scanning direction is a direction parallel to the rotational axis of the photosensitive body 2041. Further, the circumferential direction of the photosensitive body 2041 will be referred to as a sub-scanning direction. A development roller 2044 causes toner to adhere to the electrostatic latent image of the photosensitive body 2041 by outputting a development bias voltage, thereby forming a toner image on the photosensitive body 2041. Note that the toner is supplied from a toner container 2045. A primary transfer roller 2045 transfers the toner image of the photosensitive body 2041 onto the intermediate transfer belt 208 by outputting a primary transfer bias voltage.

Returning to FIG. 2, the intermediate transfer belt 208 is driven to rotate in a clockwise direction in the figure at the time of image formation. Accordingly, the toner image on the intermediate transfer belt 208 is conveyed to a position facing a secondary transfer roller 209. The secondary transfer roller 209 transfers the toner image of the intermediate transfer belt 208 onto a sheet conveyed from a cassette 201 or a cassette 202 along a conveyance path 203 by outputting a secondary transfer bias voltage. After the toner image is transferred, the sheet is conveyed to a fixing unit 211. The fixing unit 211 causes the toner image to be fixed to the sheet by heating and pressurizing the sheet. The sheet on which the toner image is fixed by the fixing unit 211 is conveyed to a position 214. Note that depending on the type of sheet, further fixing by a fixing unit 213 is necessary, and such sheets are conveyed to the position 214 via the fixing unit 213. Meanwhile, sheets that do not require further fixing by the fixing unit 213 are conveyed to the position 214 via a conveyance path 212.

When forming an image on only one side of a sheet, the sheet is conveyed from the position 214 to a position 215 and then conveyed to the image capturing unit 131 on the downstream side (FIG. 3). Meanwhile, when forming an image on both sides of a sheet, the sheet is conveyed to a reversing path 216 via the position 214 and then conveyed again to the position facing the secondary transfer roller 209 via a conveyance path 217. Thereafter, the sheet on which the images have been formed on both sides is conveyed to the image capturing unit 131 via the position 215. In the following description, when an image is formed on both sides, the surface of the sheet on which the image is first formed will be referred to as a first surface, and the surface of the sheet on which the image is last formed will be referred to as a second surface. When an image is formed on only one surface, an image is formed on the first surface, and an image is not formed on the second surface.

Proceeding to FIG. 3, the sheet conveyed to the image capturing unit 131 is conveyed to the stacker 240 via a conveyance path 233. The image capturing unit 131 includes image capturing devices 231 and 232. The image capturing device 231 captures one surface of the sheet, and the image capturing device 232 captures the other surface of the sheet. Image data of the sheet surfaces that the image capturing devices 231 and 232 have captured is transmitted to the inspection apparatus 150 as illustrated in FIG. 1. The inspection apparatus 150 determines a product defect (i.e., an image defect of an image formed on the sheet or a defect caused to the sheet itself) based on the image data and feeds back the determination result to the control unit 110 of the image forming apparatus 100.

The stacker 240 has an escape tray 246 which is a discharge tray. The escape tray 246 serves as a discharge destination for sheets determined to be a defective product by the inspection apparatus 150. When outputting a sheet to the escape tray 246, the sheet is discharged to the escape tray 246 via a conveyance path 244 and a conveyance path 247. The stacker 240 has a stack tray 241 on which a large number of sheets can be stacked. When stacking sheets on the stack tray 241, the sheets conveyed to the stacker 240 are conveyed to a reversing path 249 and then discharged to the stack tray 241 via the conveyance paths 244 and 245. Meanwhile, when conveying a sheet to the finisher 250 on the downstream side, the sheet is conveyed via the conveyance path 244 and a conveyance path 248.

The finisher 250 performs a stapling process, a punching (hole punching) process, a binding process, and the like according to the specifications by the user. After the processes in the finisher 250, the sheet is discharged to one of a discharge tray 251, a discharge tray 252, and a saddle stitch binding tray 258.

FIG. 5 illustrates a print job management table managed by the control unit 110. The control unit 110, upon receiving the print job, adds an entry (row) for the management table based on the content of the print job. In job ID fields of FIG. 5, identifiers of print jobs that the control unit 110 allocated to the print jobs when the print jobs were received are stored. In sheet number fields, numbers assigned in order of image formation for the sheets on which images will be formed in each print job are stored. Here, the control unit 110 adds an entry for the management table in the numerical order (ascending order) of sheets. Cassette fields store information indicating the cassette 201 or the cassette 202 in which the corresponding sheet is stored. Page number fields contain the page numbers of images. For example, in the case of double-sided printing, a page number is assigned to each of the first side and the second side, and in the case of single-sided printing, a page number is assigned to only the first side and the page number of the second side is "none". Inspection result fields store the inspection results of the sheets inspected by the inspection apparatus 150. Note that when a print job is received and an entry is added, the initial value of the inspection result field is "none". Then, "NG" is stored in the inspection result field of a sheet determined by the inspection apparatus 150 to be a defective product, and "OK" is stored in the inspection result field of a sheet not determined to be a defective product. A pointer 310 indicates a sheet to be fed from the cassette 201 or 202 next. The control unit 110, upon feeding the sheet of the entry indicated by the pointer 310, advances the entry that the pointer 310 indicates to the next entry (in FIG. 5, one entry below).

Figure 6B:
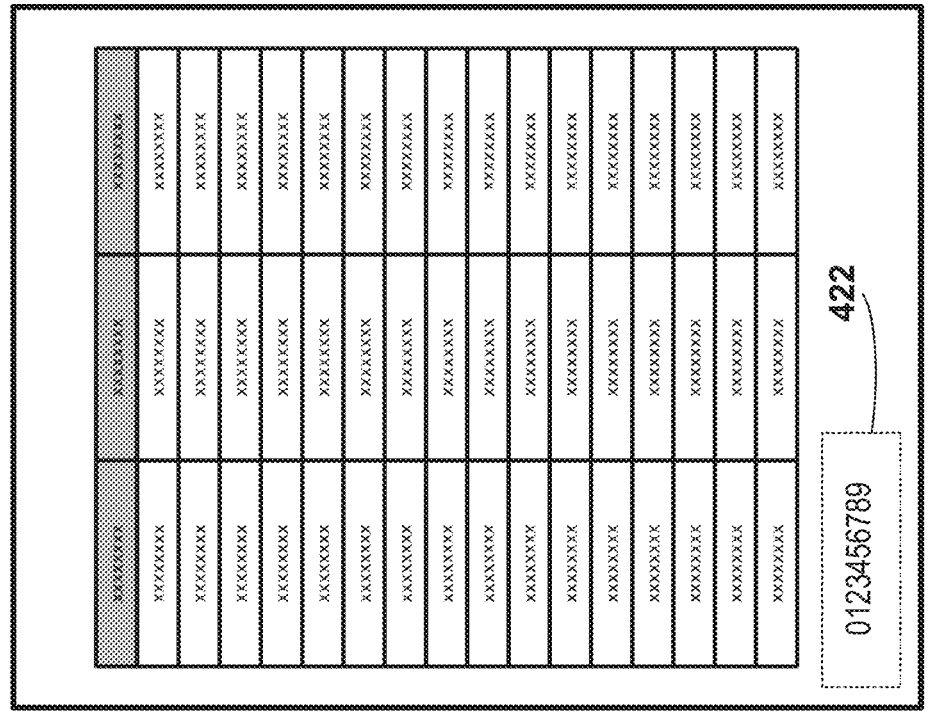
FIGS. 6A and 6B are explanatory diagrams of examples of product defect determination.
Figure 6A:
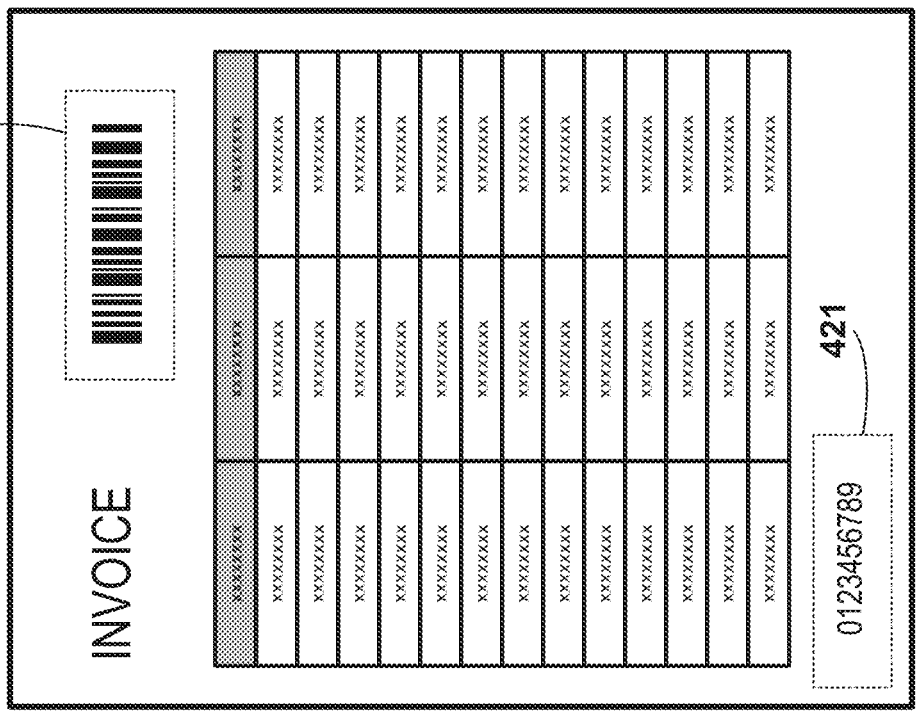

Next, a process performed by the inspection apparatus 150 will be described. The inspection apparatus 150 determines whether or not a product defect has occurred by analyzing image data sent from the image forming apparatus 100 in accordance with preset inspection information. Hereinafter, an example of an inspection will be described. FIGS. 6A and 6B illustrate images captured by the image capturing unit 131. Note that FIG. 6A is an image of the first surface, and FIG. 6B is an image of the second surface. Reference numerals 410, 421, and 422 in FIGS. 6A and 6B are inspection areas indicated by inspection information. The inspection apparatus 150 determines whether or not a bar code in the inspection area 410 can be read in accordance with the inspection information. If the bar code cannot be read, the inspection apparatus 150 determines that the product is a defective product. When the bar code can be read, the inspection apparatus 150 determines a numerical value (character string) in each of the inspection area 421 and the inspection area 422 by image recognition in accordance with the inspection information. Note that the image forming apparatus 100 prints the same numerical value in the inspection area 421 and the inspection area 422. When the numerical values determined from the inspection area 421 and the inspection area 422 by image recognition are different, the inspection apparatus 150 determines that the product is a defective product. On the other hand, when the bar code in the inspection area 410 can be read, and the numerical values in the inspection area 421 and the inspection area 422 match, the inspection apparatus 150 determines that the product is normal.

Note that the inspection described with reference to FIGS. 6A and 6B is an example, and the inspection apparatus 150 can determine various types of product defects. Examples of the types of product defects are, for example, a shift in position at which to form an image on a sheet (shift in formation position), an overlap of sheets, missing of sheets, a color misregistration, a tone shift, and the like. For example, when a product defect is determined by comparing image data (reference image) used to form an image with image data of a sheet captured by the image capturing unit 131, the control unit 110 also transmits the image data used to form the image to the inspection apparatus 150. In addition, the inspection apparatus 150 can determine not only one type of product defect but also a plurality of types of product defects individually. As described above, the content of the process executed by the inspection apparatus 150 to determine the product defect of each type is set in advance as the inspection information in the inspection apparatus 150 and the image forming apparatus 100.

Figure 7:
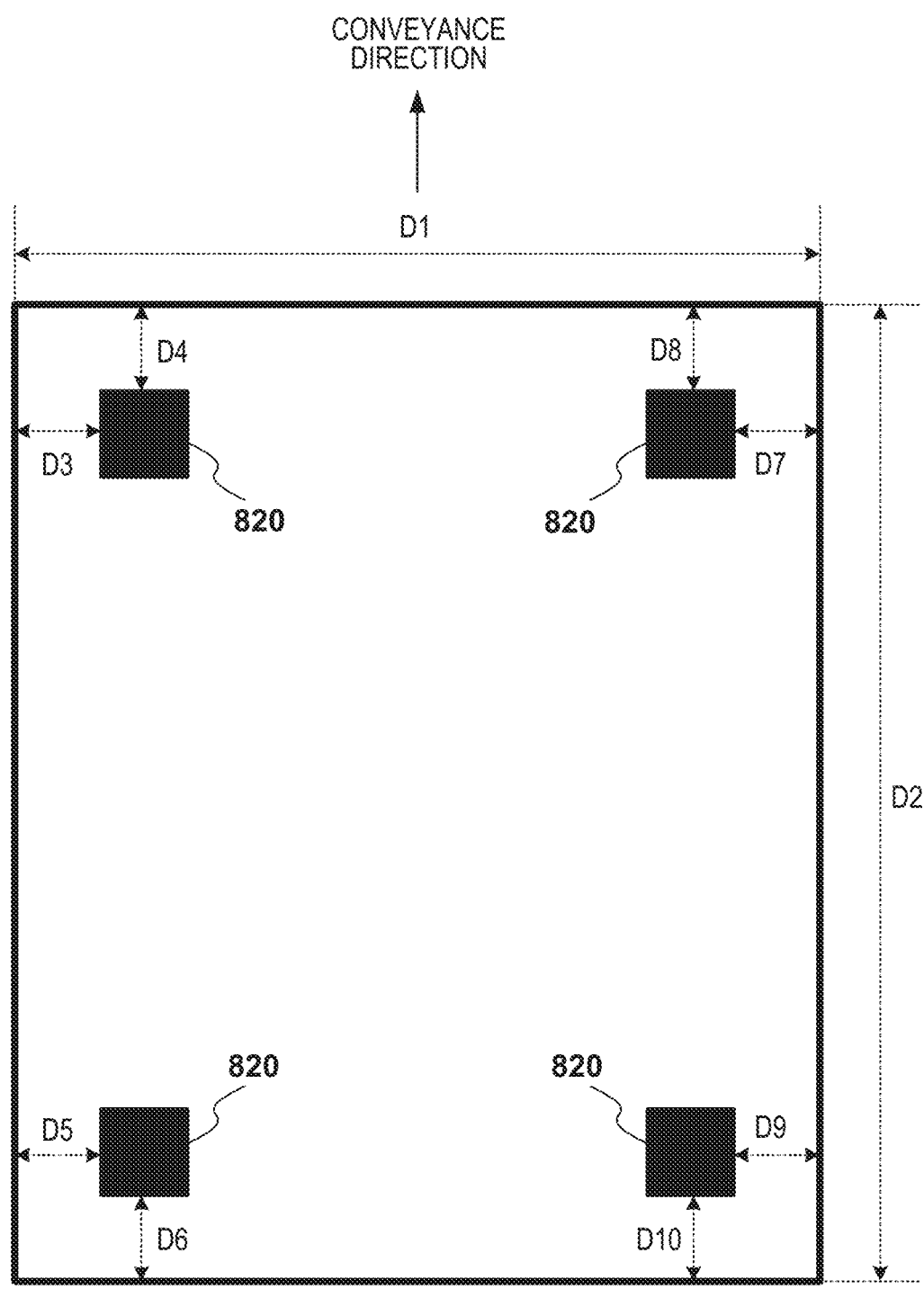
FIG. 7 is a diagram illustrating an example of an image for adjustment.

FIG. 7 illustrates an image for adjustment used in the operation of adjusting a formation position performed by the image forming apparatus 100 when the inspection apparatus 150 determines that a product defect of the formation position shift has occurred. Although FIG. 7 illustrates only the first surface of the sheet, the same image is also formed on the second surface of the sheet. As illustrated in FIG. 7, the image for adjustment has four marks 820 formed in predetermined positions on a sheet. In this example, it is assumed that the marks are formed such that the lengths D3 to D10 in FIG. 7 are 1 cm, respectively. The image capturing unit 131 captures the first side and the second side of a sheet on which the image for adjustment has been formed and transmits the captured image data to the inspection apparatus 150. The inspection apparatus 150 determines two lengths, a length D1 of the sheet in a direction perpendicular to the conveyance direction and a length D2 of the sheet in the conveyance direction, based on the image data received from the image forming apparatus 100. Further, the inspection apparatus 150 determines the marks 820 based on the image data received from the image forming apparatus 100 and determines the eight lengths D3 to D10 on the first surface of the sheet. Further, the inspection apparatus 150, also on the second surface of the sheet, determines four marks formed on the second surface and determines the eight lengths in the same manner as the first surface. That is, the inspection apparatus determines a total of 18 lengths. The inspection apparatus 150 transmits the determined 18 lengths to the image forming apparatus 100.

Figure 8A:
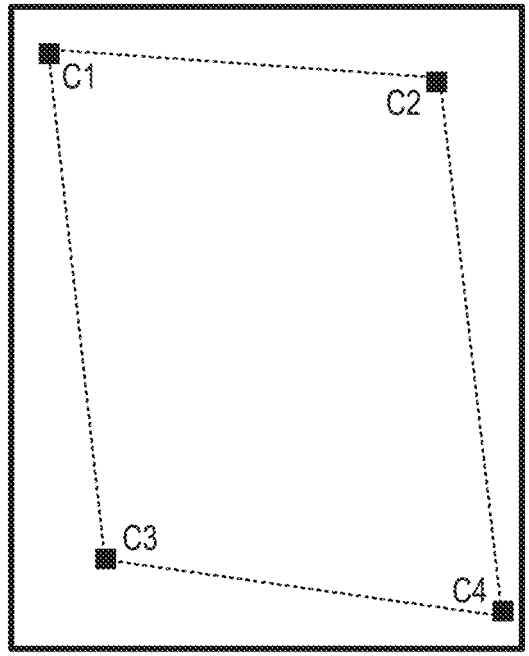
FIGS. 8A to 8D are explanatory diagrams of examples of correction information calculation.

The control unit 110 obtains correction information for reducing a shift in formation position based on the 18 lengths received from the inspection apparatus 150, and stores the correction information in the RAM 113. Hereinafter, the correction information and the transformation of the image data for reducing a shift in formation position based on the correction information will be described with reference to FIGS. 8A to 8D and FIGS. 9A and 9B. In FIGS. 8A to 8D and FIGS. 9A and 9B, bold square frames indicate the sides of sheets. In FIGS. 8A to 8D and FIGS. 9A and 9B, the upper left corner is the origin, the left-right direction of the figure is the X direction, and the vertical direction is the Y direction. Note that it is assumed that the value of X increases from left to right, and the value of Y increases from top to bottom. The X direction corresponds to a direction of scanning (main scanning direction) by the exposure apparatus 2043. The Y direction corresponds to the sub-scanning direction. FIG. 8A illustrates four points C1 to C4 obtained by the lengths D1 to D10 received from the inspection apparatus 150. The coordinates of the point C1 are (D3, D4); the coordinates of the point C2 are (D1-D7, D8); the coordinates of the point C3 are (D5, D2-D6); and the coordinates of the point C4 are (D1-D9, D2-D10).

Figure 8B:
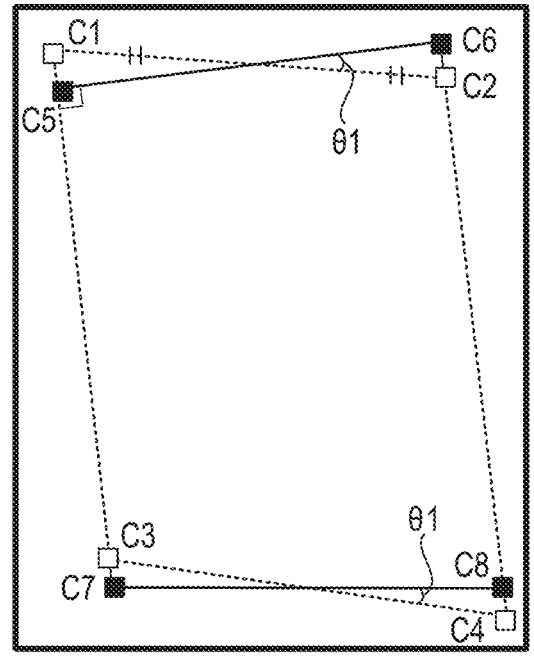
Figure 8C:
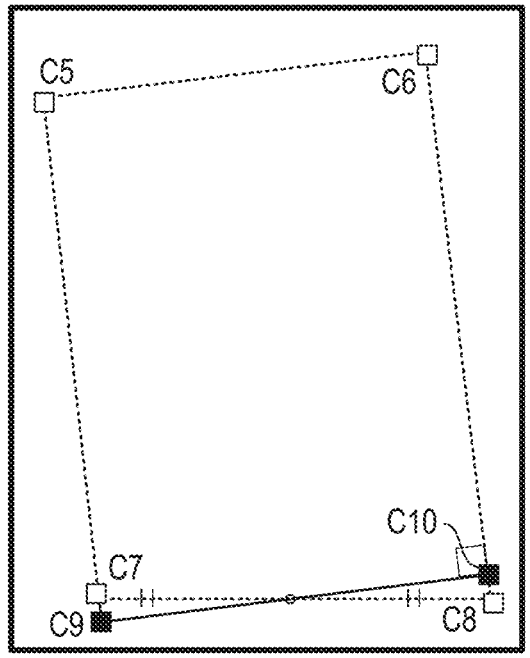
Figure 8D:
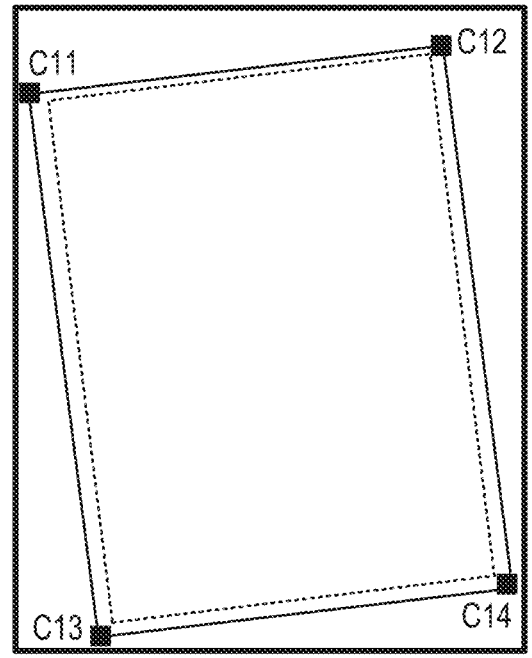

First, a right-angle correction for making a straight line connecting the points C1 and C2 perpendicular to a straight line connecting the points C1 and C3 is performed. As illustrated in FIG. 8B, the right-angle correction is performed by obtaining a write start position of the image in each scan in the main scanning direction so that each of points C1 to C4 becomes points C5 to C8 with respect to a center position of a straight line connecting points C1 and C2. Subsequently, a trapezoidal correction for making a straight line connecting the points C7 and C8 perpendicular to a straight line connecting the points C5 and C7 is performed. As illustrated in FIG. 8C, the trapezoidal correction is performed by obtaining a scale factor in the sub-scanning direction so that the points C7 and C8 become the points C9 and C10, respectively, with respect to the center position of the straight line connecting the point C7 and C8. Subsequently, in order to make the lengths of the image in the main scanning direction and the sub-scanning direction an ideal length as illustrated in FIG. 8D, a scale correction is performed so that points C5, C6, C9, and C10 become points C11 to C14, respectively, with respect to the center of the image. Note that in this example, since the lengths D3 to D10 are 1 cm, the ideal lengths of the image in the main scanning direction and the sub-scanning direction are shorter than D1 and D2 by 2 cm, respectively.

Figure 9A:
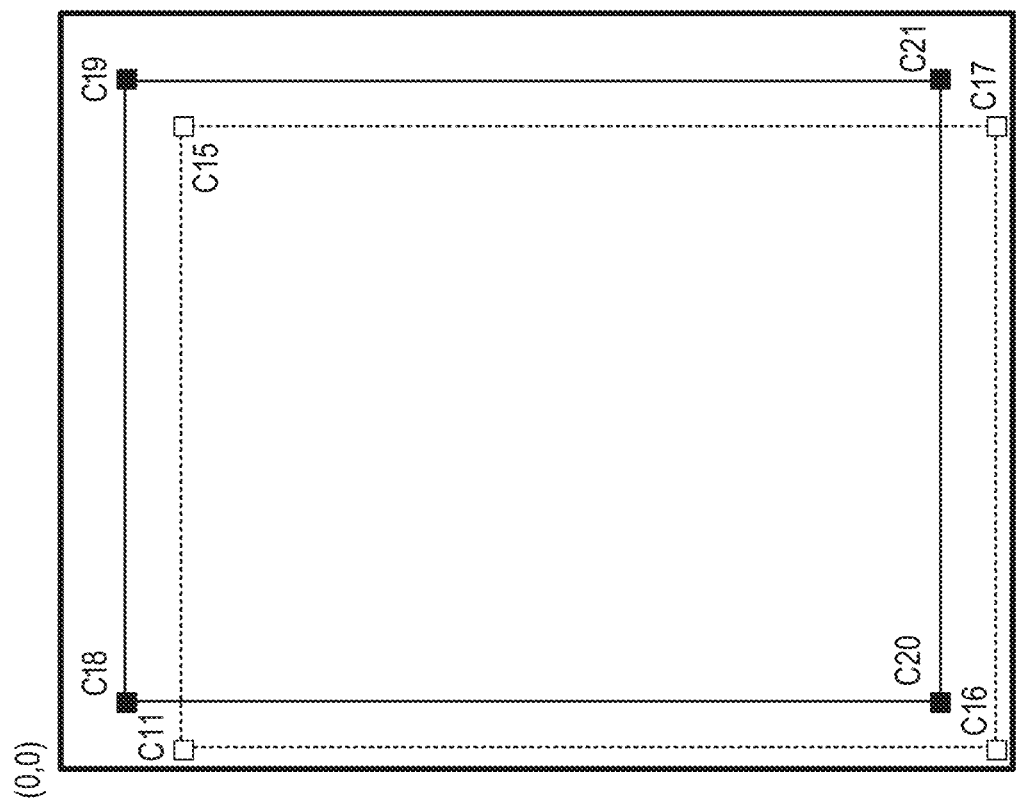
FIGS. 9A and 9B are explanatory diagrams of examples of correction information calculation.
Figure 9B:
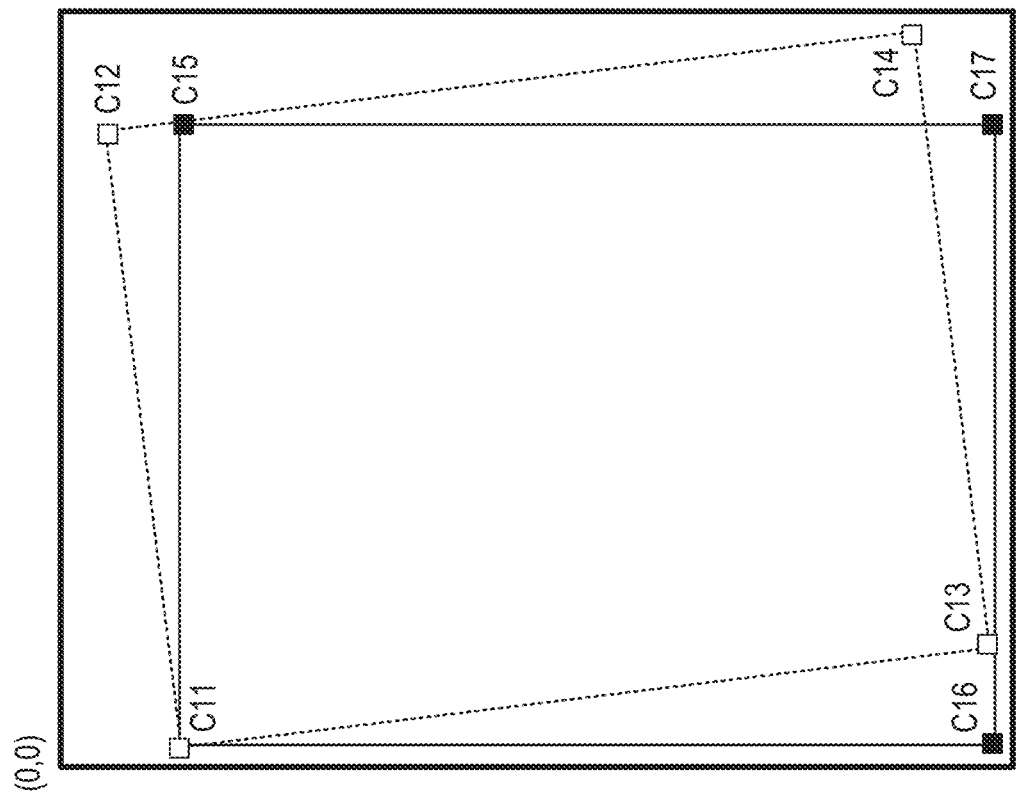

Subsequently, as illustrated in FIG. 9A, a straight line connecting points C11 and C12 is rotated with the point C11 as the rotational axis so as to be parallel to the X direction, and a skew is corrected so that each of points C12 to C14 becomes points C15 to C17. Finally, as illustrated in FIG. 9B, the write start positions are corrected so that the center of a rectangle connecting the points C11, C15, C16, and C17 is the center of the sheet.

The control unit 110 stores the write start position of the image in each scan in the main scanning direction, the scale factor in the sub-scanning direction, the scale factor of the scale correction, the rotational angle in the skew correction, and the like as correction information in the RAM 113. Then, at the time of image formation, the control unit 110 sets image forming conditions based on the correction information and performs transformation of image data.

Figure 10:
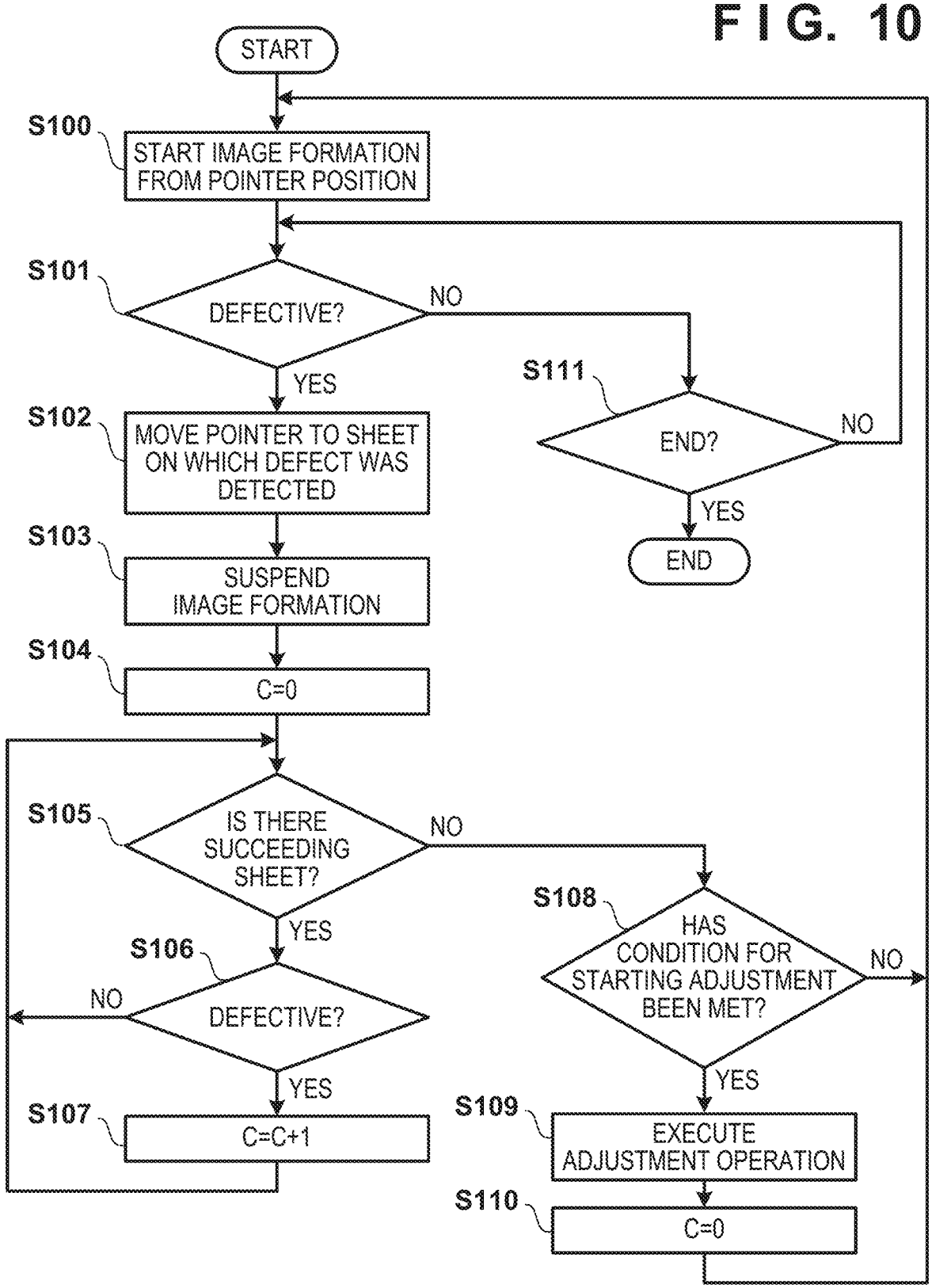
FIG. 10 is a flowchart of a process executed by the control unit according to the embodiment.

FIG. 10 is a flowchart of a process executed by the control unit 110 upon receiving a print job. Note that in the example of FIG. 10, it is assumed that the inspection apparatus 150 determines a shift in formation position of an image. Further, as described above, the control unit 110, upon receiving the print job, adds an entry to the management table of FIG. 5. If no other job is ongoing when a print job is received, the pointer 310 is moved to a position of an entry for a sheet on which an image will be formed first in the print job. In step S100, the control unit 110 starts forming an image from a sheet corresponding to an entry in the management table indicated by the pointer 310. As described above, the control unit 110 causes the image capturing unit 131 to capture a sheet on which an image has been formed and transmits the image data to the inspection apparatus 150. Then, the control unit 110 acquires a determination result as to whether a product defect has occurred from the inspection apparatus 150.

In step S101, the control unit 110 determines whether a product defect has occurred to the sheet based on the determination result from the inspection apparatus 150. If a product defect has not occurred, the control unit 110 determines in step S111 whether formation of all images have been completed by the print job. If image formation is not completed, the control unit 110 repeats the process from step S101. Meanwhile, if the image formation is completed, the control unit 110 ends the process of FIG. 10.

Further, if a product defect has occurred in step S101, the control unit 110 moves the pointer 310 to an entry of the sheet having the product defect and sets the inspection result field of the entry to "NG" in step S102, and stops (suspends) image formation in step S103. Note that as described above, a sheet having a product defect is discharged to the escape tray 246. Subsequently, the control unit 110 initializes a counter C to 0 in step S104 and determines whether there is a succeeding sheet in step S105. Note that in the present embodiment, a succeeding sheet refers to a sheet succeeding the sheet in which a product defect has occurred and having already been fed from the cassette 201 or 202 to the image forming apparatus 100 or on which an image has already been transferred when the image formation was stopped in step S102.

When there are succeeding sheets, the control unit 110 causes the inspection apparatus 150 to also inspect the succeeding sheets and determines in step S106 whether or not a product defect has occurred. Then, the counter C is incremented by 1 in step S107 each time there is a sheet having a product defect. Note that all of these succeeding sheets are discharged to the escape tray 246 regardless of whether or not a product defect has occurred.

When all the subsequent sheets have been discharged to the escape tray 246, the control unit 110 determines in step S108 whether or not a condition to start the adjustment operation is satisfied. For example, configuration may be taken such that if the value of the counter C is greater than or equal to a threshold, the condition to start the adjustment operation is satisfied. For example, the threshold may be 2. The value of the counter C being the threshold of 2 or more means that a product defect has occurred in two or more succeeding sheets, and thus it is for enabling to determine that a defect is not a sporadic defect but a recurring defect. Note that if the total number of succeeding sheets is less than the threshold, it is not determined that a recurring defect is occurring even if a recurring defect is occurring. Therefore, configuration may be taken such that the condition to start the adjustment operation is satisfied even when the total number of succeeding sheets is less than the threshold.

If the condition for starting the adjustment operation is not satisfied, the control unit 110 determines that the defect is a sporadic defect and repeats the process from step S100. Meanwhile, when the condition for starting the adjustment operation is satisfied, the control unit 110 executes the adjustment operation for reducing a shift in formation position in order to reduce the occurrence of the product defect in step S109. For example, the adjustment image illustrated in FIG. 7 is formed, and a sheet on which an adjustment image is formed is captured by the image capturing unit 131, and image data of the sheet is transmitted to the inspection apparatus 150, and correction information is obtained and updated based on information fed back from the inspection apparatus 150. Thereafter, the control unit 110 initializes the counter C to 0 in step S110 and repeats the process from step S100. Note that since the pointer 310 is indicating an entry of a sheet having a product defect in the process in step 102, image formation is resumed from the image formed on the sheet having a product defect in the later step S100 (recovery process). That is, it is possible to print an image corresponding to the image of the sheet having a product defect on another sheet (second sheet) by the recovery process after the sheet (first sheet) having a product defect is discharged to the escape tray 246.

As described above, in the present embodiment, when a product defect is detected it is determined whether or not a sheet succeeding such a sheet also has a product defect, and based on the determination result, it is determined whether the defect is a recurring defect or a sporadic defect. If it is determined that the defect is a recurring defect, the adjustment operation is executed. With this configuration, it is possible to prevent the product defect from occurring again after the recovery process, thereby preventing the time required for image formation from becoming long. In addition, usability can be improved because the user does not need to determine whether or not the defect is a recurring defect. Further, since in the case where it is determined that the defect is a sporadic defect, unnecessary adjustment operation is not executed, it is possible to prevent the time required for image formation from becoming long.

Note that in the flowchart of FIG. 10, when a product defect is detected, it is determined in the process in steps S104 to S108 whether the defect is a recurring defect or a sporadic defect, and when it is determined that the defect is a recurring defect, the adjustment operation is executed. However, as described above, it is also possible to configure such that the adjustment operation is always performed when a product defect is detected. In this case, a flowchart is such that steps S104 to S108 and S110 of the flowchart of FIG. 10 are omitted; after step S103, the process in step S109 is executed; and then the process is repeated from step S100. A possibility that a product defect may occur again after the recovery process is reduced by executing the adjustment operation before the recovery process, and thus, it is possible to prevent a time required for image formation from becoming long.

Second Embodiment

Next, the second embodiment will be described focusing on the difference from the first embodiment. In the first embodiment, when the condition for starting the adjustment operation is satisfied, the control unit 110 executes the adjustment operation. However, when the user can determine that the product defect is due to a mistake of the user when setting a sheet or a blot on a sheet that was there from the beginning, there is no need to perform the adjustment operation. In the present embodiment, it is possible for the user to select whether or not to actually execute the adjustment operation when the condition for starting the adjustment operation is satisfied.

Figure 11:
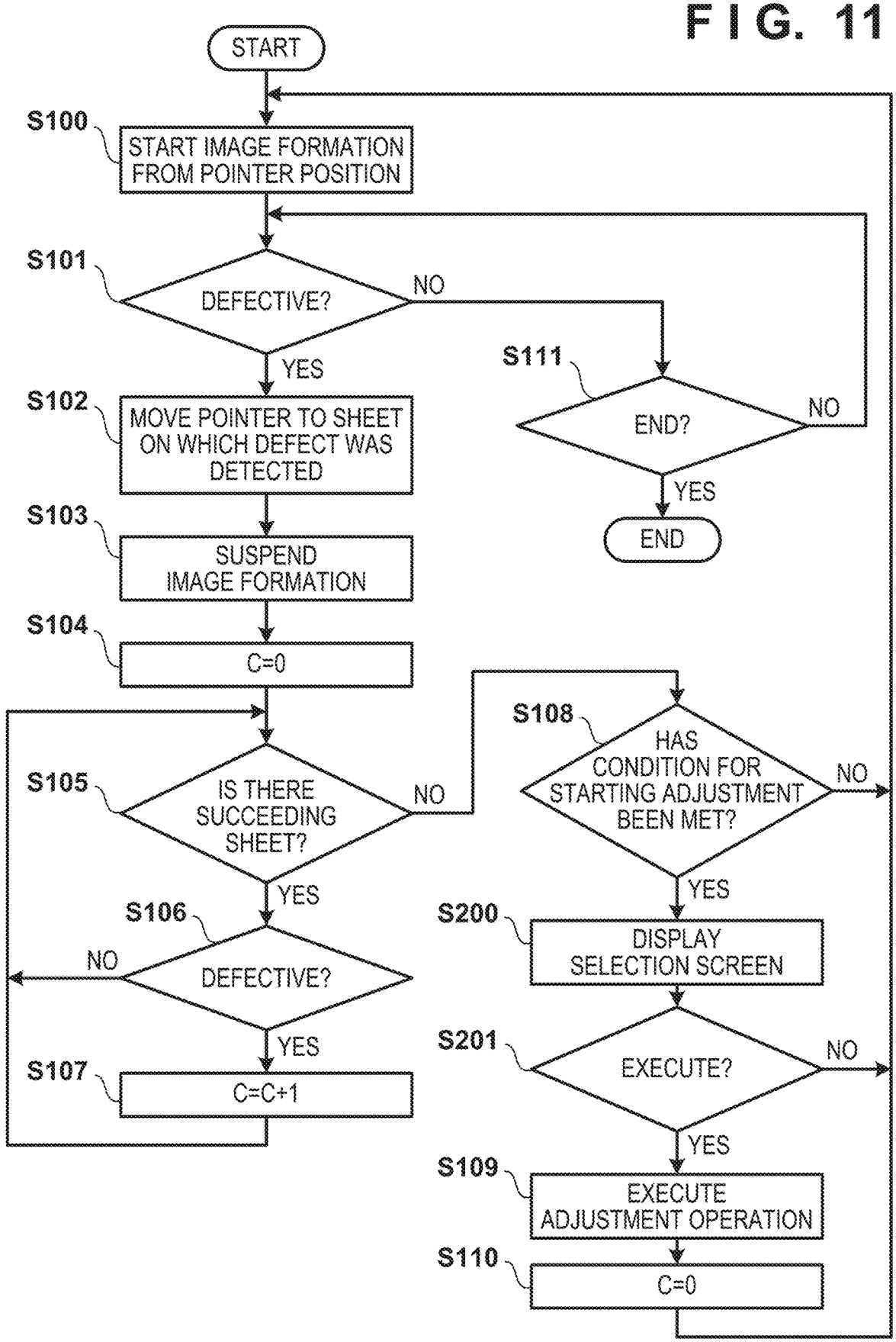
FIG. 11 is a flowchart of a process executed by the control unit according to the embodiment.

FIG. 11 is a flowchart of a process executed by the control unit 110 upon receiving a print job. Note that the same step numbers are assigned to the processing steps that are similar to those in the flowchart of the first embodiment illustrated in FIG. 10, and the description thereof will be omitted.

Figure 12:
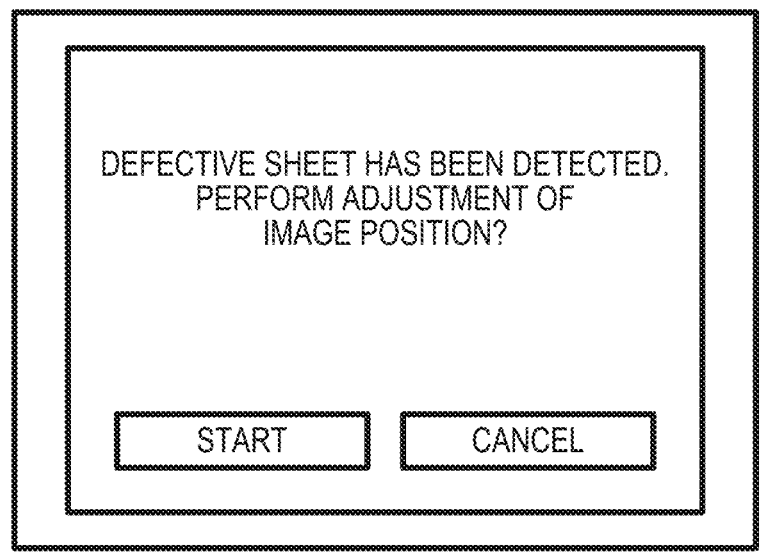
FIG. 12 is a diagram illustrating an example of a selection screen.

In the present embodiment, when the condition for starting the adjustment operation is satisfied in step S108, the control unit 110 displays a selection screen for the user to select whether or not to execute the adjustment operation on the operation panel 120 in step S200 and then determines a user input in step S201. FIG. 12 illustrates an example of the selection screen. When the user permits the adjustment operation to be performed by, for example, touching "start" in FIG. 12, the control unit 110 performs the adjustment operation in step S109. Meanwhile, if the user does not allow the adjustment operation to be executed by touching "cancel" in FIG. 12, for example, the control unit 110 repeats the process from step S100.

As described above, in the present embodiment, when the condition for starting the adjustment operation is satisfied, the user is prompted to input whether or not to execute the adjustment operation instead of automatically starting the adjustment operation. According to this configuration, even if the condition for starting the adjustment operation is satisfied, the adjustment operation is not performed in a case where the user can determine that the defect is a sporadic defect, and the time required for image formation can be prevented from becoming long.

Note that in the present embodiment, steps S104 to S108 and S110 of FIG. 11 can be omitted similarly to the first embodiment. That is, configuration may be taken such that when a product defect is detected, the selection screen of FIG. 12 is displayed, and when the user permits execution of the adjustment operation, the adjustment operation is executed, and when the user does not permit execution of the adjustment operation, the adjustment operation is not executed.

Third Embodiment

Next, the third embodiment will be described focusing on the difference from the first and second embodiments. In the first and the second embodiments, the inspection apparatus 150 determines a shift in formation position as a product defect, and when the condition for starting the adjustment operation is satisfied, the image forming apparatus 100 performs the operation of adjusting the formation position. In the present embodiment, the adjustment operation for tones, that is, the respective gradations of yellow, magenta, cyan, and black, and the operation of adjusting the formation position are selectively executed.

Figure 13:
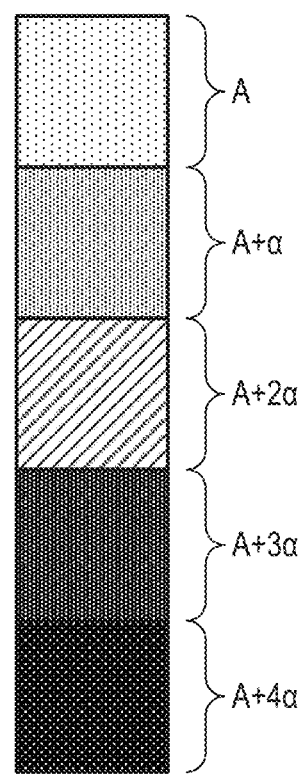
FIG. 13 is a diagram illustrating an example of an image for measuring maximum density.

First, the operation of adjusting gradation will be described. The operation of adjusting gradation includes a process of determining emission luminance of the exposure apparatus 2043 for obtaining a predetermined maximum density and a process of creating a gradation correction table. The image forming apparatus 100 forms an image for measuring maximum density illustrated in FIG. 13 on a sheet in order to determine the emission luminance of the exposure apparatus 2043 for obtaining the predetermined maximum density. According to FIG. 13, the image for measuring maximum density includes five patch images formed by scanning the photosensitive body 2041 with five different levels of emission luminance. Specifically, the lowest level of emission luminance is A, and the other four levels of emission luminance are A+α, A+2α, A+3α, and A+4α. The image capturing unit 131 captures a sheet on which the image for measuring maximum density is formed. The control unit 110 determines the density of each patch image based on the image data captured by the image capturing unit 131. Then, the control unit 110 determines the emission luminance of the exposure apparatus 2043 for obtaining maximum density based on the emission luminance used for forming each patch image and the density of each patch image. Note that in the present embodiment, the maximum density is controlled by adjusting the emission luminance of the exposure apparatus 2043, but configuration may be taken such that the maximum density is controlled by adjusting other parameters related to density. For example, the maximum density can be controlled by the development bias voltage outputted from the development roller 2044.

Figure 14:
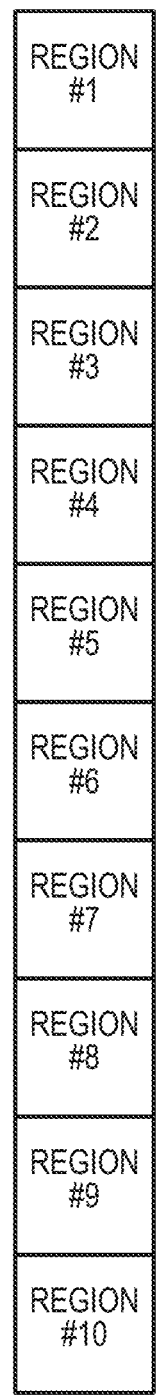
FIG. 14 is a diagram illustrating an example of an image for measuring gradation.

After determining the emission luminance of the exposure apparatus 2043 for maximum density, the control unit 110 forms an image for measuring gradation illustrated in FIG. 14 on a sheet. The image for measuring gradation includes a plurality of patch images of different densities. In FIG. 14, the number of gradations is 10, but the number of gradations may be other than 10. The pixel value (value of image data) of each pixel of the same region is the same. The image capturing unit 131 captures a sheet on which the image for measuring gradation is formed. The control unit 110 determines the density of each patch image based on the image data captured by the image capturing unit 131. Then, based on the pixel value of each patch image and the density of each patch image, the control unit 110 creates a gradation correction table, which is data for correcting pixel values in order to bringing the relationship between the pixel value and the density closer to an ideal state.

Figure 15:
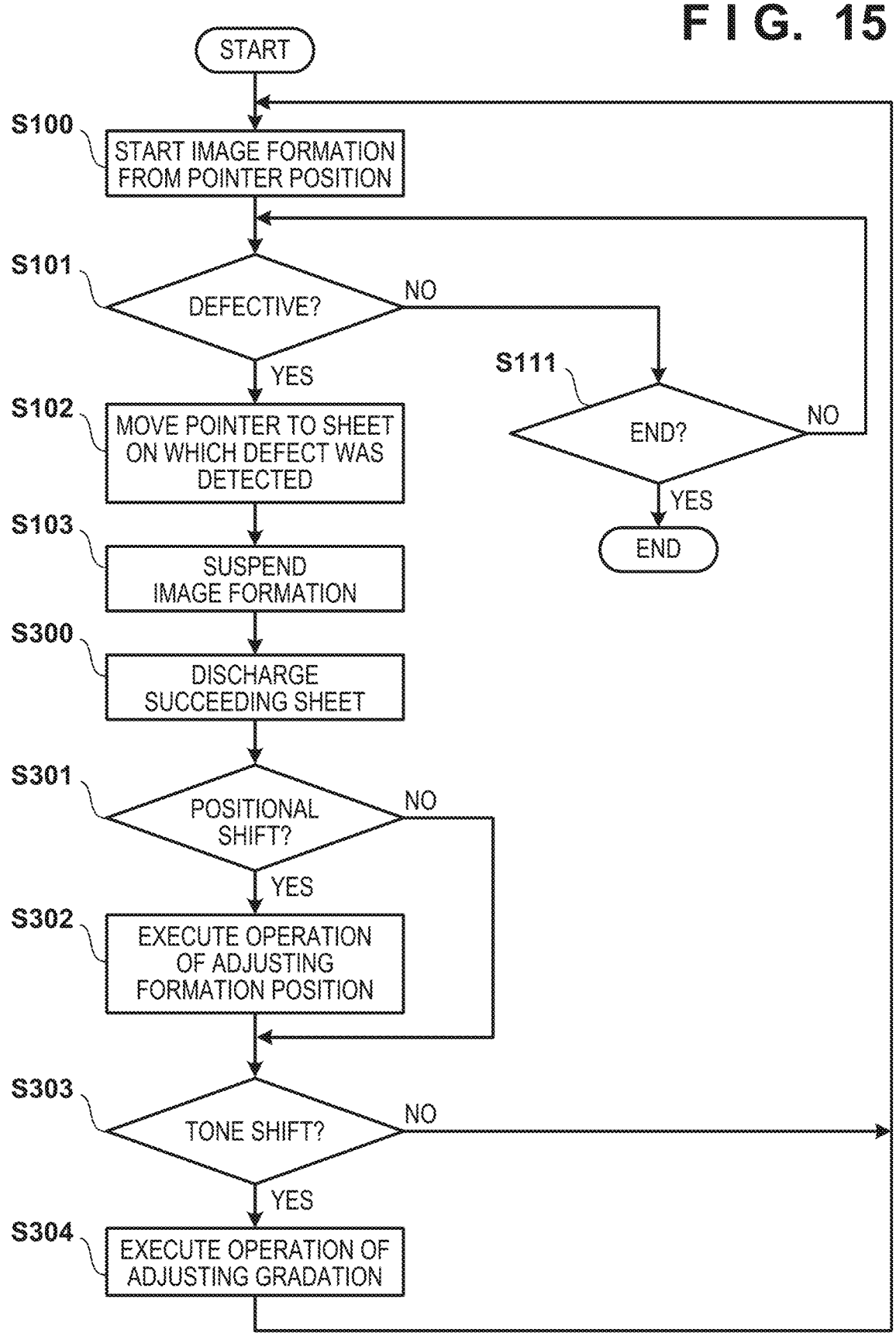
FIG. 15 is a flowchart of a process executed by the control unit according to the embodiment.

FIG. 15 is a flowchart of a process executed by the control unit 110 upon receiving a print job. Note that the same step numbers are assigned to the processing steps that are similar to those in the flowchart of the first embodiment illustrated in FIG. 10, and the description thereof will be omitted. In the present embodiment, the inspection apparatus 150 determines whether a product defect is a shift in position at which to form an image or a tone shift and notifies the control unit 110 of the determination result, that is, the type of product defect. Therefore, in step S101, the control unit 110 acquires information about the type of product defect from the inspection apparatus 150 in addition to whether or not a product defect has occurred.

The control unit 110, upon suspending image formation in step S103, discharges the succeeding sheets to the escape tray 246 in step S300. Then, in step S301, the control unit 110 determines whether a shift in formation position is notified as a product defect. When the shift in formation position is not notified, the control unit 110 advances the process to step S303. Meanwhile, when the shift in formation position is notified, the control unit 110 executes the operation of adjusting the formation position in step S302 in the same manner as in step S109 of the first embodiment and then advances the process to step 303. Then, in step S303, the control unit 110 determines whether a tone shift is notified as a product defect. If a tone shift is not notified, the control unit 110 repeats the process from step S100. Meanwhile, if a tone shift is notified, the control unit 110, in step S304, performs the operation of adjusting gradation described with reference to FIGS. 13 and 14 and repeats the process from step S100.

As described above, in the present embodiment, the adjustment operation corresponding to the type of product defect detected by the inspection apparatus 150 is executed. Therefore, unnecessary adjustment operation is not performed, and the time required for image formation can be prevented from becoming long, and usability can be improved.

Note that although the inspection apparatus 150 is an external apparatus of the image forming apparatus 100 in each of the above embodiments, the inspection apparatus 150 may be a component of the image forming apparatus 100. That is, the image forming apparatus 100 may be configured to execute the inspection function executed by the inspection apparatus 150. In addition, the first and the second embodiments can be combined with the third embodiment. For example, when a product defect of a first type occurs, the control unit 100 may be configured to inspect the succeeding sheet and, if the product defect of the first type has occurred to the succeeding sheets that are greater than or equal to the threshold, perform the adjustment operation for suppressing the product defect of the first type.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-203652, filed Dec. 8, 2020, which is hereby incorporated by reference herein in its entirety.

What is claimed is:

1. An image forming system comprising:
an image former configured to form an image on a sheet;
an inspector configured to inspect the sheet on which the image has been formed by the image former and determine whether or not the sheet has a product defect;
a first discharger to which the sheet on which the image has been formed by the image former is discharged;
a second discharger to which the sheet on which the image has been formed by the image former is discharged; and
a controller configured to discharge to the first discharger the sheet determined by the inspector to not have the product defect and discharge to the second discharger the sheet determined by the inspector to have the product defect, wherein
the controller is configured to,
in a case where the inspector determines that a first sheet on which the image has been formed by the image former has the product defect,
execute an adjustment operation of adjusting image forming conditions for the image former, and
execute a recovery process in which the image formed on the first sheet is formed on a second sheet by the image former with the product defect removed based on completion of the adjustment operation.

2. The image forming system according to claim 1, wherein
the inspector is configured to, in a case where the sheet on which the image has been formed by the image former has the product defect, determine a type of the product defect from a plurality of types of product defects, and
the controller is configured to execute the adjustment operation according to the type of product defect that the inspector has determined.

3. The image forming system according to claim 2, wherein the plurality of types of product defects includes at least one of a shift in formation position, an overlap of sheets, missing of sheets, a color misregistration, and a tone shift.

4. The image forming system according to claim 1, wherein the controller is configured to, in a case where the inspector determines that the first sheet has the product defect, discharge to the second discharger the first sheet and all of the sheets succeeding the first sheet and on which the image has already been formed by the image former by the time the inspector has determined that the first sheet has the product defect.

5. The image forming system according to claim 1, further comprising a display configured to, in a case where the inspector determines that the first sheet has the product defect, display a selection screen in which whether or not to execute the adjustment operation can be selected.

6. The image forming system according to claim 1 further comprising:
an image capturing assembly configured to capture the sheet on which the image has been formed by the image former and output image data, wherein
the inspector is configured to determine whether or not the sheet has the product defect based on the image data outputted by the image capturing assembly.

7. The image forming system according to claim 1, wherein the inspector is configured to determine whether or not the second sheet on which the image has been formed by the recovery process has the product defect.

8. An image forming system, comprising:
an image former configured to form an image on a sheet;
an inspector configured to inspect the sheet on which the image has been formed by the image former and determine whether or not the sheet has a product defect;
a first discharger to which the sheet on which the image has been formed by the image former is discharged;
a second discharger to which the sheet on which the image has been formed by the image former is discharged; and
a controller configured to discharge to the first discharger the sheet determined by the inspector to not have the product defect and discharge to the second discharger the sheet determined by the inspector to have the product defect, wherein
the controller is configured to, in a case where the inspector determines that a first sheet on which the image has been formed by the image former has the product defect, execute a recovery process in which the image formed on the first sheet is formed on a second sheet, and
the controller is configured to, in a case where the inspector determines that the first sheet has the product defect, cause the inspector to inspect a plurality of succeeding sheets succeeding the first sheet and determine whether or not to execute an adjustment operation based on an inspection result of the succeeding sheets by the inspector.

9. The image forming system according to claim 8, wherein the controller is configured to, in a case where the number of succeeding sheets that the inspector has determined to have the product defect is greater than or equal to a threshold, determine to execute the adjustment operation and, in a case where the number of succeeding sheets that the inspector has determined to have the product defect is less than the threshold, determine to not execute the adjustment operation.

10. The image forming system according to claim 8 further comprising a display configured to, in a case where the controller determines to execute the adjustment operation, display a selection screen in which whether or not to execute the adjustment operation can be selected.

11. The image forming system according to claim 8, wherein the controller is configured to, in a case where the inspector determines that the first sheet has the product defect, discharge to the second discharger the first sheet and all of the sheets succeeding the first sheet and on which the image has already been formed by the image former by the time the inspector has determined that the first sheet has the product defect.

12. The image forming system according to claim 8, further comprising:
an image capturing assembly configured to capture the sheet on which the image has been formed by the image former and output image data, wherein
the inspector is configured to determine whether or not the sheet has the product defect based on the image data.

13. The image forming system according to claim 8, wherein the inspector is configured to determine whether or not the second sheet on which the image has been formed by the recovery process has the product defect.

* * * * *